Fig. 1
| Vowel | Filter 1 | Filter 2 | Filter 3 |
|---|---|---|---|
| E | • | • | — |
| O | — | • | • |
• Filter reacts
– Filter does not react
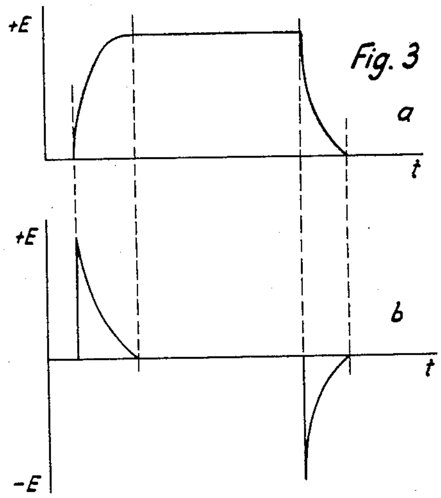
Fig. 3
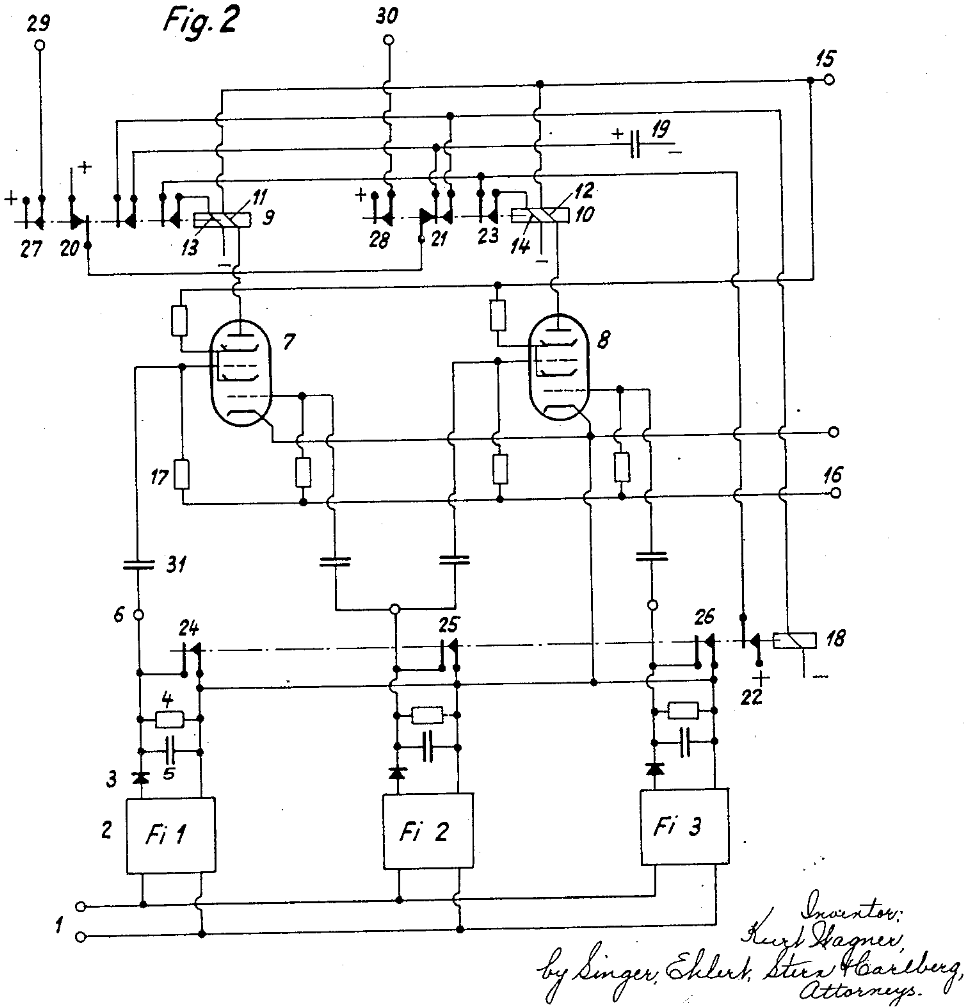
Fig. 2
Inventor:
Kurt Wagner,
by Singer, Ehlert, Stern & Carlberg,
Attorneys.

June 6, 1950 K. WAGNER 2,510,268

WIRING SYSTEM FOR THE SELECTIVE FILTERING OF VOWEL SOUNDS

Filed Oct. 16, 1948 2 Sheets-Sheet 2

Inventor:
Kurt Wagner,
by Singer, Ehlert, Stern & Carlberg,
Attorneys.

Patented June 6, 1950 2,510,268

UNITED STATES PATENT OFFICE 2,510,268

WIRING SYSTEM FOR THE SELECTIVE FILTERING OF VOWEL SOUNDS

Kurt Wagner, Zurich, Switzerland, assignor to Daphne Investment Trust, Vaduz, Liechtenstein Application October 16, 1948, Serial No. 54,894

4 Claims. (Cl. 178—44)

The invention relates to improvements in voice operated electrical circuits for use with telephone systems.

It is a known fact that by means of suitably tuned filters it is possible to select by filtration from a mixture of frequencies, as constituted by human speech, certain frequencies which definitely characterise certain vowel sounds. It is moreover known that for the characterisation of a certain vowel sound two individual characteristic frequencies are usually required; in simple cases, when only two vowel sounds have to be distinguished from each other, one frequency may suffice for purposes of characterisation.

The object of the present invention is a wiring system which enables ordinary relays of the type commonly known in telephony to be operated by means of alternating currents supplied by band filters. It is here taken for granted that the band filters as such are already known. The purpose of the present wiring system is, in the first place, to furnish the output required for exiting telephone relays, since generally the required output cannot be supplied by a filter, and secondly to react upon the alternating currents supplied by the filters in such a way that upon arrival of a certain vowel sound only a certain relay allocated to this vowel sound is excited. A secondary purpose of the wiring system of the invention to be as insensitive as possible to interference frequencies, as devices employing the wiring system of the invention are chiefly connected to public telephone lines; furthermore, it is an object of the invention to make the attraction period of the relay excited by a vowel of constant length, regardless of the varying duration of the spoken vowel.

With a view to explaining the principle of the invention more fully there are illustrated in the drawing a few typical embodiments under operating conditions which arise in actual practice.

In the drawing:

Fig. 1 illustrates a table indicating a filter combination for two vowels,

Fig. 2 illustrates a wiring diagram of the invention,

Fig. 3 illustrates a voltage-time diagram for one vowel, and

Figure 4:
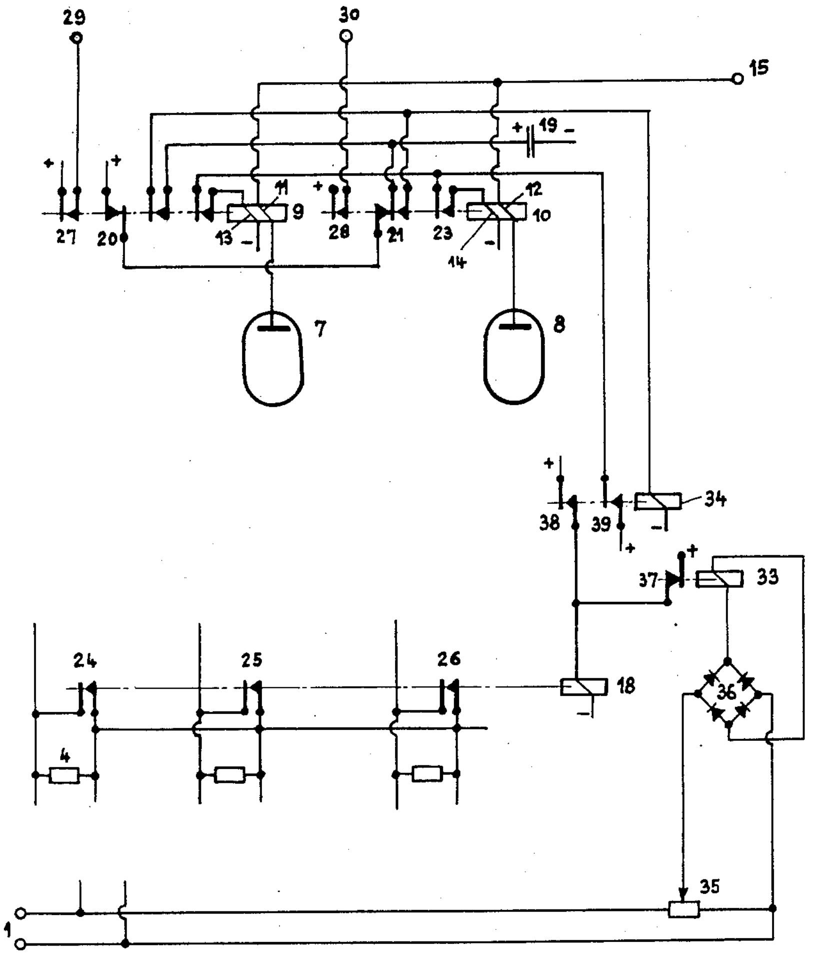
Fig. 4 illustrates a modification of the invention.

It is assumed that, by the enunciation of the vowels "E" and "O," in the case of each vowel a relay allocated to it be excited for a pre-determined length of time. As already stated above, it is not possible to tune band filters in such a way that for each vowel a band filter may be provided which responds only when this particular vowel occurs; on the contrary in the present case three individual filters are required which respond in accordance with the diagrammatic representation in Fig. 1. By "respond" it is to be understood that an alternating current occurs at the output side of the filter in question, which current is of considerably greater magnitude than the current produced by interference sounds. As shown in Fig. 1, each of the two vowels excites two filters 1, 2 and 2, 3 respectively, and it will be noted that the filter 2 is excited in both cases. Assuming that these conditions prevail, the embodiment of the invention as shown in Fig. 2 will now be explained.

The currents emanating from any desired microphone (not shown here) are fed after suitable amplification to the input terminals 1 and arrive, as shown, at the input sides of the above mentioned filters connected in parallel which, in order to correspond to Fig. 1, are accordingly designated with the abbreviations "Fi. 1"–"Fi. 3." To avoid overburdening the diagrammatic representation with numerals, all equal wiring elements will henceforth be marked on the same level and only the elements directly connected with the filter 1 will be provided with numerals. The alternating currents supplied by the filter output sides are now converted by means of the rectifier 3, the ballast resistances 4 and the smoothing condensers 5 into direct current impulses, as shown in part *a* of Fig. 3. As can be seen, the ends on the right of all ballast resistances are connected together and are grounded; moreover the rectifiers 3 are poled in such a way that the positive pole of the direct current appears at the terminals 6 marked in the drawing.

Now follows the actual vowel evaluation device, consisting of two electron tubes 7 and 8, with relays 9 and 10 inserted in their anode circuits. The types of tubes used are such which have two control grids, with separate leads, such as are commonly used today in radio technology and known as mixing tubes. The relays have two windings, the operating windings 11 and 12 which are inserted in the anode circuits of the tubes and the holding windings 13 and 14 which are excited via various contacts from a separate source of current.

A so-called power pack not shown in the drawing, supplies the valves with the operating voltage and also with the heating voltage. The anode voltage of suitable magnitude being fed via the terminal 15 and a grid auxiliary voltage is supplied via the terminal 16, which latter current is fed to all control grids of the tubes via high-ohmic resistances 17 and the magnitude of which is such that each individual control grid is able to block the anode current, regardless of the voltage which is applied to the other grids. Thus, to enable an anode current to flow which current is used to attract a relay, both grids of one tube must lose their negative auxiliary voltage at the same time.

In order to achieve this, the above-mentioned direct current impulses appearing at the ballast resistances 4 (see part *a* of Fig. 3) are directed via differential condensers 31 to the various control grids as illustrated in the diagrammatic representation in Fig. 1, in such a way that the two control grids of the same tube are always influenced by two filters designating a certaine vowel. The grids of the tube 7 are therefore connected to the filters 1 and 2, corresponding to the vowel "E," and those of the valve 8 are connected to the filters 2 and 3, corresponding to the vowel "O."

If, now, one of the two above-mentioned vowels, for example an "O," is fed, as previously mentioned, to the device in the form of a compound alternating current, the filters 2 and 3 will respond. At the two ballast resistances 4 pertaining to these two filters one direct current impulse of the form shown in Fig. 3*a* will be produced, both at the same time, and the length of these two impulses will be identical with the length of the spoken vowel. The grids of the two tubes receive impulses via the condensers 31 in accordance with part *b* of Fig. 3, since these condensers differentiate the signal received, i. e. at the commencement of the direct current impulse a short positive impulse and at the end a short negative impulse. Only the positive impulse is exploited, the negative impulse remaining inactive, as will be shown later. As is now evident only the two control grids of the tube 8 receive simultaneously one positive impulse each; and the relay 10 in the respective anode circuit will therefore attract for the duration of this double impulse. Moreover, one control grid of the tube 7 receives an impulse; nevertheless no anode current can flow as the other control grid remains negative. The other vowel E acts upon the filters F1 and F2 in similar fashion, as may now easily be conceived. Summarising, it can therefore be stated that upon arrival of a vowel only one single relay allocated solely to the vowel in question attracts for a short space of time.

Provision must still be made to insure that, when one of the two relays is attracted, that the same remains arrested long enough for the devices operated by the relays to function properly, and it must further be arranged that during this time the other relay is prevented from attracting. This is necessary, as otherwise the attraction period of the relays is subject to chance interference currents and the magnitude of the signal received, which may in certain cases be inadequate. For this purpose a holding and blocking relay 18 common to both relays 9 and 10 is used, which relay now enters into operation. For the following circuits the supply lines to the separate source of current are not shown in the drawing but, as is customary in relay wiring technique, only intimated by plus and minus signs respectively.

Upon operation of the connection the condenser 19 is first of all charged via the following circuit:

positive pole—contact 20—contact 21—condenser 19—negative pole.

Assuming now, as mentioned above, that relay 10 is attracted, the condenser 19 is discharged via the winding of the relay 18, in accordance with the following circuit:

Condenser positive pole—contact 21—winding 18—negative pole.

During this discharge process the relay 18 is now lifted, thus causing the already excited relay 10 to be held via: positive pole—contact 22—contact 23—winding 14—negative pole.

Secondly, all condensers 5 are discharged with the relay 18 via its contacts 24, 25 and 26 and the entire arrangement is blocked until the relay 18 drops again. The duration of attraction of the relay 18 is dependent upon the capacity of the condenser 19 and the resistance of the winding of the relay 18 and can thus be adapted to the particular purpose in each case. After the relay 18 has dropped, the relay 10 likewise drops and the condenser 19 is recharged via the circuit; positive pole—contact 20—contact 21—contact 19—negative pole.

Thus the arrangement has returned to its state of rest and is ready for the selective filtering of a new vowel. Exactly the same process takes place when the relay 9 is excited, with the sole difference that this relay is now held during its period of attraction by the relay 18. The impulses corresponding to the individual vowels are transmitted to the terminals 29 and 30 via the contacts 27 and 28, where they may be put to further use for controlling other devices.

The arrangement described generally operates perfectly satisfactorily so long as it is connected up to telephones or lines which are not affected by powerful interference currents. If particularly powerful and irregular interference currents occur, as is often the case with telephone lines, undesired control impulses may be produced, as the condensers 5 may be partly charged by interference currents and this charge, upon the arrival of a vowel is then added to the actual useful charge and can thus produce undesired results. In order to suppress this phenomenon to the greatest possible extent, provision is made by means of a supplementary device shown in Fig. 4 for the relay 18 in Fig. 2 to remain excited until the arrival of a vowel; in this case all condensers 5 remain short-circuited by its contacts 24, 25 and 26, and further undesired charges are prevented. In this Fig. 4 only those parts provided for supplementarily to the arrangement according to Fig. 2 and those parts of the arrangement according to Fig. 2 directly co-operating with these are represented; all other parts correspond exactly to Fig. 2.

The supplementary device shown in Fig. 4 consists essentially of the control relay 33 and the auxiliary relay 34. The relays 9 and 10 correspond to the items bearing the same numerals in Fig. 2, likewise relay 18 and the input terminals 1. As may be seen, a potentiometer 35 is connected to the input terminals 1, by means of which former an adjustable portion of the input voltage is supplied to a rectifier 36. The direct current supplied by the rectifier controls control relay 33. By means of the potentiometer 35 the sensitivity of relay 33 is adjusted in such a manner that the latter no longer responds to the interference currents to be suppressed.

In the state of rest the relay 18 remains excited via the circuit:

Positive pole—contact 37—relay 18—negative pole.

The condensers 5 are short-circuited at the filter output sides via the contacts 24, 25 and 26, as already mentioned in the description of Fig. 2. If a vowel arrives, relay 33 is first excited and opens with its contact 37 the circuit just described causing the relay 18 to drop. The short-circuits at the condensers are eliminated and the evaluation arrangement consequently enters into action, with the result that one of the two relays 9 and 10 is excited. If relay 10 is assumed to have been excited, for example, the condenser 19 will thereby be discharged via the winding of relay 34, through the following circuit:

Condenser positive pole—contact 21—winding 34—negative pole.

For the duration of this discharge the relay 34 attracts and first of all causes relay 18 to attract again.

Positive pole—contact 38—winding 18—negative pole.

Through relay 18 the condensers are again short-circuited and the arrangement is blocked, as already described in relation to Fig. 2.

Secondly, relay 34 causes the already excited relay 10 to be held, through the circuit:

Positive pole—contact 39—contact 23—winding 14—negative pole.

With the time-constant of the circuit containing the condenser 19 and the winding 34, the period of attraction of relay 34 can be adapted to individual requirements. After the relay 34 has dropped, the relay 10 also drops again and condenser 19 is re-charged as described in connection with Fig. 2.

After the relay 34 has dropped, relay 18 drops only if relay 33 is still excited, i. e. if the vowel which caused relay 10 to respond is again pronounced. After the cessation of same, relay 33 drops and causes the attraction of relay 18 via the circuit:

Positive pole—contact 37—winding 18—negative pole.

In this way the entire arrangement is re-blocked until the arrival of a further vowel, as the condensers 5 are again short-circuited via the contacts 24, 25 and 26.

As has now been described in detail, the arrangement functions in such a way that ordinary telephone relays are excited by spoken vowel sounds and remain in the excited state for a certain length of time, regardless of how long the vowel sound is pronounced. There is no need for special relays and the greatest possible operating safety is ensured by blockage during the period of attraction of a relay and in the intervals between the individual vowels. The arrangement may of course also be elaborated for the selective filtering not only of two vowel sounds but of all vowel sounds. However, the principle remains the same, one relay and one valve being required per vowel sound, with the possible addition of further filters.

What I claim as my invention and desire to secure by Letters Patent, is:

1. In a voice operated electrical circuit, an input circuit adapted to be supplied with alternating current impulses produced by spoken vowels, a plurality of filters, means for connecting said filters in parallel to said input circuit, there being provided two filters for each predetermined vowel, means connected to each filter for converting the alternating current impulses passing therethrough into direct current impulses, a plurality of electron tubes, one for each vowel and provided with two control grids, a relay for each tube, means for connecting said relays into the anode circuits of said tubes, and means connecting the positive output leads of said current impulse converters pertaining to one vowel to the two control grids of at least one of said tubes, the arrangement being such that the respective relays being rendered operative to attract their armatures when both control grids of one tube are energized simultaneously by direct current impulses supplied by two filters passing alternating current impulses produced by the same vowel.

2. In a voice operated electrical circuit, an input circuit adapted to be supplied with alternating current impulses produced by spoken vowels, a plurality of filters, means for connecting said filters in parallel to said input circuit, there being provided two filters for each predetermined vowel, means connected to each filter for converting the alternating current impulses passing therethrough into direct current impulses, a plurality of electron tubes, one for each vowel and provided with two control grids, a relay for each tube, means for connecting said relays into the anode circuits of said tubes, means connecting the positive output leads of said current impulse converters pertaining to one vowel to the two control grids of at least one of said tubes, the arrangement being such that the respective relays being rendered operative to attract their armatures when both control grids of one tube are energized simultaneously by direct current impulses supplied by two filters passing alternating current impulses produced by the same vowel, a holding and blocking relay arranged in a circuit which is adapted to be closed by the action of anyone of said first named relays when rendered operative by the anode current of anyone of said tubes, a holding winding on said last named relay and circuit means therefor arranged to be energized when said holding and blocking relay is energized, and means closed by the energisation of said last mentioned relay for causing the positive output leads of said current impulse converters to be grounded, whereby said control grids are de-energized and the circuit is being restored to a condition in which it may be actuated by another vowel.

3. A voice operated electrical circuit as claimed in claim 2, including a condenser for controlling the length of time said holding and blocking relay is energized, means for normally connecting said condenser with a source of current for maintaining said condenser charged, means controlled by anyone of said relays connected in the anode circuits of said tubes for disconnecting said source from said condenser and connecting said condenser with the circuit of said holding and blocking relay so that the latter is energized by the discharge of said condenser.

4. A voice operated electrical circuit, an input circuit adapted to be supplied with alternating current impulses produced by spoken vowels, a plurality of filters, means for connecting said filters in parallel to said input circuit, there being provided two filters for each predetermined vowel, means connected to each filter for converting the alternating current impulses passing therethrough into direct current impulses, a plurality of electron tubes, one for each vowel and provided with two control grids, a relay for each tube, means for connecting said relays into the anode circuits of said tubes, means connecting the positive output leads of said current impulse converters pertaining to one vowel to the two control grids of at least one of said tubes, the arrangement being such that the respective relays being rendered operative to attract their armatures when both control grids of one tube are energized simultaneously by direct current impulses supplied by two filters passing alternating current impulses produced by the same vowel, a holding and blocking relay arranged in a circuit which is adapted to be closed by the action of anyone of said first named relays when rendered operative by the anode current of anyone of said tubes, a holding winding on said last named relay and circuit means therefor arranged to be energized when said holding and blocking relay is energized, and means closed by the energisation of said last mentioned relay for causing the positive output leads of said current impulse converters to be grounded, whereby said control grids are de-energized and the circuit is being restored to a condition in which it may be actuated by another vowel, means including a condenser for controlling the length of time said holding and blocking relay is energized, means for normally connecting said condenser with a source of current for maintaining said condenser charged, means including a control relay, an auxiliary relay and an adjustable rectifier for controlling the operation of said holding and blocking relay, means supplying said rectifier with alternating current impulses from said input circuit and means supplying the direct current impulses produced by said rectifier to said control relay which when energized opens the circuit of said holding and blocking relay, and means controlled by anyone of said relays connected in the anode circuits of said tubes for disconnecting said source from said condenser and connecting said condenser with circuit means which include said auxiliary relay which when energized becomes effective to close the circuit of said holding windings and also closes the circuit of said holding and blocking relay.

KURT WAGNER.

REFERENCES CITED

The following references are of record in the file of this patent:

UNITED STATES PATENTS

| Number | Name | Date |
|---|---|---|
| 1,951,454 | Tiefenbacher | Mar. 20, 1934 |
| 2,195,081 | Dudley | Mar. 26, 1940 |
| 2,238,555 | Dudley | Apr. 15, 1941 |
| 2,293,203 | Gosmann | Aug. 18, 1942 |